(12) United States Patent
Mori et al.

(10) Patent No.: US 11,366,132 B2
(45) Date of Patent: Jun. 21, 2022

(54) AUTOMATIC ANALYZER AND PROBE WASHING METHOD

(71) Applicant: Hitachi High-Technologies Corporation, Tokyo (JP)

(72) Inventors: Takamichi Mori, Tokyo (JP); Akihiro Nojima, Tokyo (JP); Isao Yamazaki, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 52 days.

(21) Appl. No.: 16/642,934

(22) PCT Filed: Oct. 5, 2018

(86) PCT No.: PCT/JP2018/037325
§ 371 (c)(1),
(2) Date: Feb. 28, 2020

(87) PCT Pub. No.: WO2019/078030
PCT Pub. Date: Apr. 25, 2019

(65) Prior Publication Data
US 2020/0348325 A1    Nov. 5, 2020

(30) Foreign Application Priority Data
Oct. 17, 2017  (JP) .............................. JP2017-200736

(51) Int. Cl.
*G01N 35/10*      (2006.01)
*B01L 3/00*       (2006.01)
(Continued)

(52) U.S. Cl.
CPC ........... *G01N 35/1004* (2013.01); *B01L 3/52* (2013.01); *B01L 3/567* (2013.01); *B01L 13/00* (2019.08);
(Continued)

(58) Field of Classification Search
CPC ........... G01N 35/1004; G01N 35/1002; G01N 35/10; B01L 13/00; B01L 3/52; B01L 3/50; B01L 3/567; B08B 9/00325; B08B 9/035
(Continued)

(56) References Cited

U.S. PATENT DOCUMENTS

| | | | |
|---|---|---|---|
| 2014/0186234 A1* | 7/2014 | Maruyama | G01N 35/1004 422/510 |
| 2015/0192600 A1 | 7/2015 | Mori et al. | |
| 2018/0021820 A1 | 1/2018 | Gebauer et al. | |

FOREIGN PATENT DOCUMENTS

| | | |
|---|---|---|
| EP | 2 390 669 A2 | 11/2011 |
| JP | 05-252993 A | 10/1993 |

(Continued)

OTHER PUBLICATIONS

Takayama, Hiroko, English Machine Translation of JP 2013-148516, abstract, description and claims, obtained from https://worldwide.espacenet.com on Jun. 24, 2021 (Year: 2021).*

(Continued)

*Primary Examiner* — Christine T Mui
(74) *Attorney, Agent, or Firm* — Mattingly & Malur, PC

(57) ABSTRACT

Since a detergent is a consumption article, it is desirable that a use amount of the detergent be as small as possible in a limit that the washing effect is not substantially reduced. Provided is an automatic analyzer which includes a syringe pump which is connected to a probe and performs the body aspiration and discharge, a feed pump which feeds washing water for washing the inside of the probe to the probe via the syringe pump and a controller which controls the dispensing mechanism and the syringe pump, in which the controller, in a case of washing the probe by sucking a detergent in the probe a plurality of times, controls the syringe pump so as (Continued)

to discharge the detergent after sucking the detergent and to suck the next detergent without feeding the washing water to the probe by the feed pump.

10 Claims, 9 Drawing Sheets

(51) Int. Cl.
 *B08B 9/032* (2006.01)
 *B08B 9/035* (2006.01)
 *B08B 9/00* (2006.01)

(52) U.S. Cl.
 CPC ............ *B08B 9/035* (2013.01); *B08B 9/0325* (2013.01); *G01N 35/1002* (2013.01); *B01L 2200/16* (2013.01); *B01L 2400/0487* (2013.01); *B01L 2400/06* (2013.01); *B08B 2209/032* (2013.01)

(58) Field of Classification Search
 USPC .................................. 422/510, 500; 436/43
 See application file for complete search history.

(56) References Cited

FOREIGN PATENT DOCUMENTS

| JP | 10-115623 | A | | 5/1998 | |
|---|---|---|---|---|---|
| JP | 2010-085098 | A | | 4/2010 | |
| JP | 2011-163909 | A | | 8/2011 | |
| JP | 2013-148516 | | * | 8/2013 | ............. G01N 35/10 |
| JP | 2015-210206 | A | | 11/2015 | |
| WO | 2008/108328 | A1 | | 9/2008 | |
| WO | 2014/017276 | A1 | | 1/2014 | |
| WO | 2016/130563 | A1 | | 8/2016 | |

OTHER PUBLICATIONS

International Search Report of PCT/JP2018/037325 dated Nov. 27, 2018.
Extended European Search Report received in corresponding European Application No. 18869346.9 dated Jun. 21, 2021.
Japanese Office Action received in corresponding Japanese Application No. 2019-549202 dated Feb. 22, 2022.

* cited by examiner

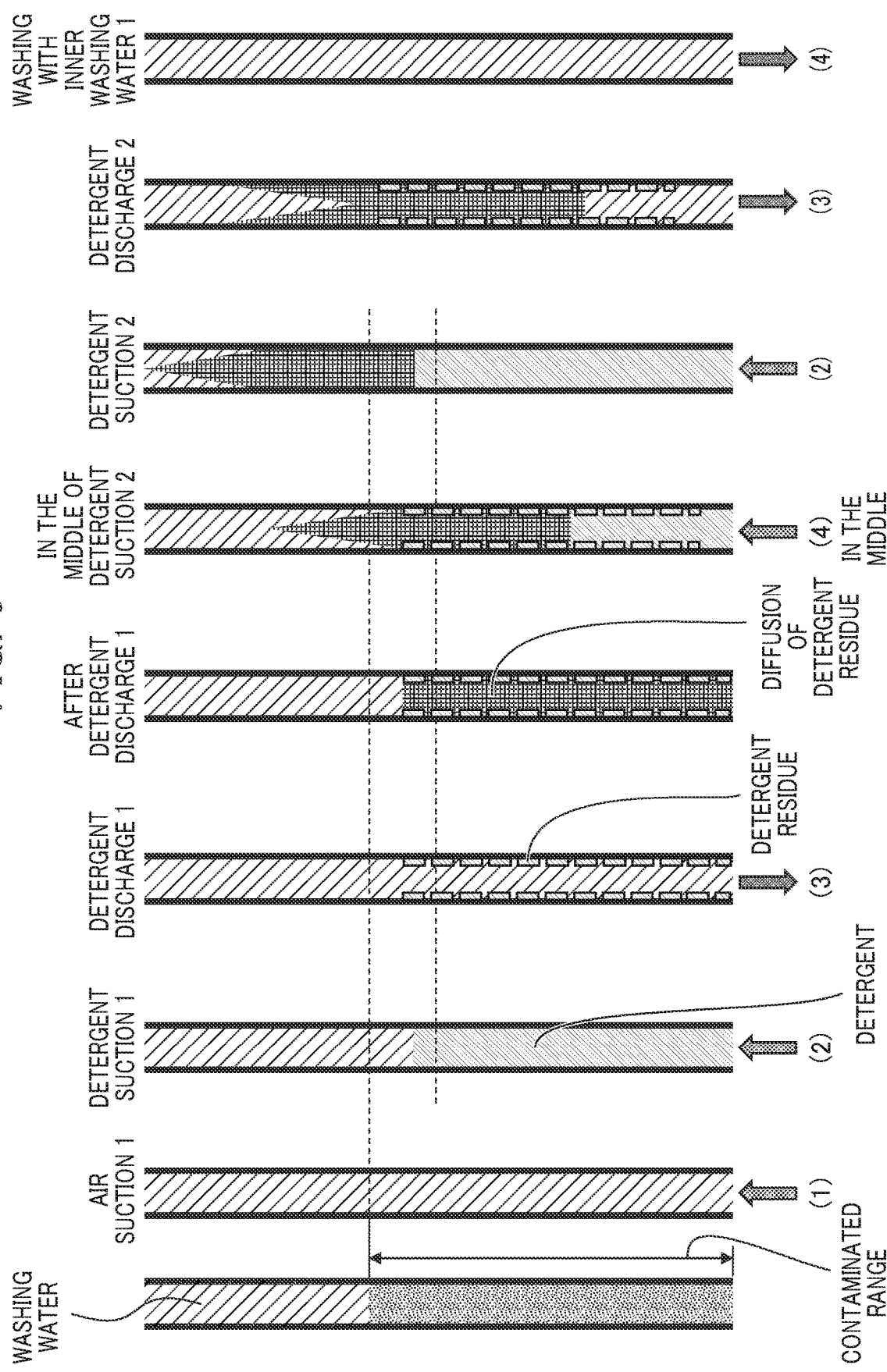

AUTOMATIC ANALYZER AND PROBE WASHING METHOD

TECHNICAL FIELD

The present invention pertains to an automatic analyzer which analyses a concentration and so forth of a predetermined component in a liquid sample such as blood, urine and so forth and a probe washing method for the automatic analyzer, and relates to the automatic analyzer which performs aspiration of a detergent and performs washing of the inner side of the probe.

BACKGROUND ART

As disclosed in Patent Literature 1, in washing the probe, the inner side of the probe is washed by, in general, repeating aspiration-discharge of the detergent a plurality of times. A method of washing a region which exceeds a contaminated range on the inner side of the probe by sucking the detergent by more increasing a detergent aspiration amount at that time than a maximum aspiration amount of a specimen is general.

CITATION LIST

Patent Literature

Patent Literature 1: Japanese Patent Application Laid-Open No. 2010-085098

SUMMARY OF INVENTION

Technical Problem

In the cited literature 1, it is disclosed that in washing of a reagent probe which sucks a reagent in the automatic analyzer, washing of the reagent probe is performed by repeating the aspiration-discharge of the detergent the plurality of times. In addition, it is disclosed that washing water which washes the inner side of the reagent probe is discharged every time after sucking and discharging the detergent in the reagent probe.

Focusing on a use amount of the detergent, it is thought that washing of the inner side of the probe is performed by sucking the detergent by more increasing the detergent aspiration amount than a maximum aspiration amount of the reagent. For example, a case where this technology is applied to a sample probe is thought of. If a maximum aspiration amount of a sample is 25 ul, washing of the inner side of the sample probe will be surely performed by sucking 35 ul of the detergent and so forth. If this washing operation is performed five times, 175 ul of the detergent will become necessary.

Since the detergent is a consumption article, it is desirable that the use amount of the detergent be as small as possible in a limit that the washing effect is not substantially reduced. However, in a technology which is disclosed in the cited literature 1, nothing is disclosed about reduction of the use amount of the detergent.

The present invention aims to provide an automatic analyzer which can wash the inner side of the probe by reducing the use amount of the detergent which is used for washing the probe.

Solution to Problem

One representative invention is as follows. It is an automatic analyzer which includes a dispensing mechanism which is equipped with a probe which performs liquid aspiration and discharge, a syringe pump which is connected to the probe and performs the liquid aspiration and discharge, a feed pump which feeds washing water for washing the inside of the probe to the probe via the syringe pump and a controller which controls the dispensing mechanism and the syringe pump, in which the controller, in a case of washing the probe by sucking a detergent in the probe a plurality of times, controls the syringe pump so as to discharge the detergent after sucking the detergent and to suck the next detergent without feeding the washing water to the probe by the feed pump.

In addition, another representative invention is a method of washing a probe of an automatic analyzer which includes a dispensing mechanism which is equipped with a probe which performs liquid aspiration and discharge, a syringe pump which is connected to the probe and performs the liquid aspiration and discharge, a feed pump which feeds washing water for washing the inside of the probe to the probe via the syringe pump and a controller which controls the dispensing mechanism and the syringe pump, in which in a case of washing the probe by sucking a detergent in the probe a plurality of times, the detergent is discharged after sucking the detergent and the next detergent is sucked without feeding the washing water to the probe by the feed pump.

That is, a contaminated range on the inner side of a sample probe can be washed by sucking again the detergent without washing away the deterrent which is left on the inner side of the probe with inside washing water after sucking and discharging the detergent in the probe.

Advantageous Effects of the Invention

According to the present invention, there can be provided the automatic analyzer which makes it possible to wash the inner side of the probe with the detergent which is smaller than heretofore in consumption amount.

BRIEF DESCRIPTION OF DRAWINGS

FIG. 9 is an explanatory diagram of the sample probe washing operation pertaining to the present embodiment.

DESCRIPTION OF EMBODIMENTS

An embodiment of an automatic analyzer of the present invention will be described by using FIG. 1 to FIG. 9.

Figure 1:
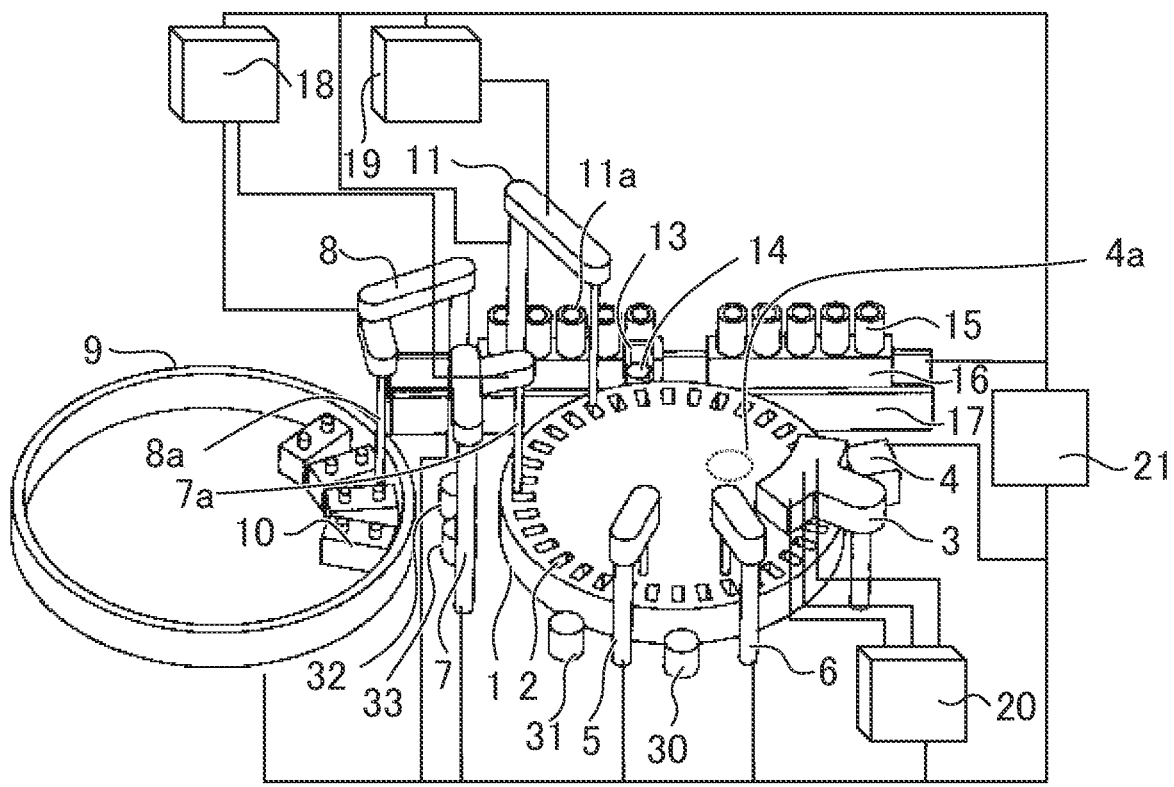
FIG. 1 is a perspective view of an automatic analyzer.

FIG. 1 is a perspective view of the automatic analyzer of the present embodiment In FIG. 1, the automatic analyzer is a device which dispenses samples and reagents into a plurality of reaction vessels 2 respectively so as to make them react with each other and measures liquids so reacted and is equipped with a reaction disk 1, a reagent disk 9, a sample conveyance mechanism 17, reagent dispensing mechanisms 7, 8, a reagent-use syringe 18, a sample dispensing mechanism 11, a sample-use syringe 19, a washing mechanism 3, a light source 4a, a spectrophotometer 4, stirring mechanisms 5, 6, a washing pump 20, washing tanks 13, 30, 31, 32, 33 and a controller 21.

The reaction vessels 2 are arrayed on the circumference of the reaction disk 1. The reaction disk 1 is equipped with the plurality of reaction vessels which mix the samples with the reagents and contain mixed liquids. The sample conveyance mechanism 17 which moves a rack 16 on which sample vessels 15 are loaded is installed near the reaction disk 1.

The sample dispensing mechanism 11 which is rotatable and vertically movable is installed between the reaction disk 1 and the sample conveyance mechanism 17 and is equipped with a sample probe 11a. The sample-use syringe 19 is connected to the sample probe 11a. The sample probe 11a moves while drawing an arc around an axis of rotation and performs sample dispensation from the sample vessels 15 to the reaction vessels 2. In addition, a detergent storage part 14 which stores a detergent which is adapted to wash the sample probe 11a is disposed on a locus of rotation of the sample probe 11a. There are a case where the detergent is used by putting it into a bottle, a case where it is automatically fed by using a detergent vessel and so forth.

It is possible to load a plurality of reagent bottles 10 in the reagent disk 9 on the circumference. The reagent disk 9 is kept cold.

The rotatable and vertically movable reagent dispensing mechanisms 7, 8 are installed between the reaction disk 1 and the reagent disk 9 and equipped with reagent probes 7a, 8a respectively. The reagent-use syringe 18 is connected to the reagent probes 7a, 8a. The reagent probes 7a, 8a move while drawing arcs around axes of rotation, gain access to the inside of the reagent disk 9 through reagent nozzle aspiration ports (not illustrated) and perform reagent dispensation from the reagent bottles 10 to the reaction vessels 2.

Further, the washing mechanism 3, the light source 4a, the spectrophotometer 4 and the stirring mechanisms 5, 6 are arranged around the reaction disk 1. The washing pump 20 is connected to the washing mechanism 3. The washing tanks 13, 30, 31, 32, 33 are installed on operation ranges of the reagent dispensing mechanisms 7, 8, the sample dispensing mechanism 11, the stirring mechanisms 5, 6 respectively. Inspection samples (specimens) of blood and so forth are contained in the sample vessels 15 and they are loaded on the rack 16 and conveyed by the sample conveyance mechanism 17.

The automatic analyzer is equipped with an analysis unit which analyses the mixed liquids which are contained in the reaction vessels 1. This analysis unit is mainly configured by the light source 4a, the spectrophotometer 4, optically measures absorbances and so forth of the mixed liquids and measures concentrations and so forth of predetermined components which are contained in the samples.

In addition, each mechanism is connected to the controller 21 and the controller 21 can control each mechanism. Incidentally, it may be also thought including the controller 21 as a configuration of the analysis unit.

The above is the general configuration of the automatic analyzer.

Next, a passage configuration of the probe will be described by using FIG. 2. Here, a passage configuration of the sample probe 11a will be described.

The sample probe 11a is connected to a feed tank 38 via the sample-use syringe pump 19. Washing water 37 is stored in the feed tank 38 and this washing water 37 is used for washing the inner side of the sample probe 11a. Incidentally, there is a case where this washing water 37 is used for washing the outer side of the sample probe 11a and, in addition, there is a case where it is also used for washing the reaction vessels 2. This washing water 37 is fed from the feed tank 38 to the sample probe 11a by a feed pump 36 which is provided between the sample-use syringe pump 19 and the feed tank 38. That is, the feed pump 36 can feed the washing water 37 which is adapted to wash the inside of the sample probe 11a to the sample probe 11a via the sample-use syringe pump 19.

In addition, whether the washing water 37 is to be fed to the sample probe 11a can be controlled by opening and closing operations of an electromagnetic valve 35 which is provided between the sample-use syringe pump 19 and the feed tank 38. That is, when the electromagnetic valve 35 is opened, the washing water 37 can be fed to the sample probe 11a and when it is closed, feeding of the washing water 37 can be stopped.

In addition, the sample-use syringe pump 19 is driven by dispensing syringe drive means 53, and a pressure in a passage which leads to the sample probe 11a is changed by driving it in a state where the electromagnetic valve 35 is closed and thereby the sample can be sucked into and discharged from the sample probe 11a.

In addition, the sample probe 11 is driven by sample prove drive means 52. The sample probe drive means 52 drives this probe via the sample dispensing mechanism 11. The sample dispensing mechanism is structured such that it can drive the sample probe 11a three-dimensionally in X, Y, Z directions. For example, three-dimensional driving on a Z axis is possible as illustrated in FIG. 1 in addition to R, θ.

The controller 21 is connected to the sample probe drive means 52, the dispensing syringe drive means 53, the electromagnetic valve 35 and can control them.

Figure 2:
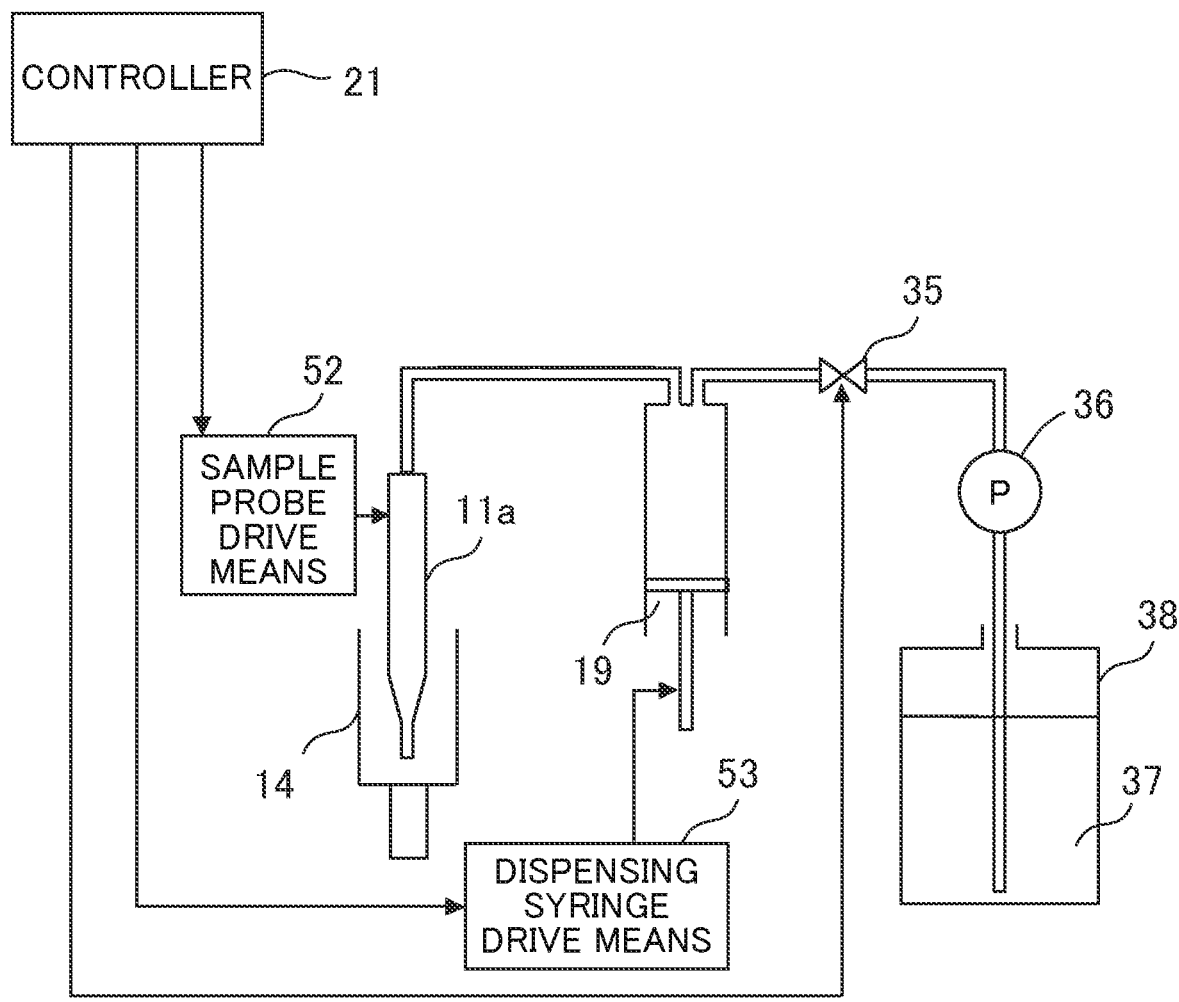
FIG. 2 is a passage configuration diagram of a sample probe.

Incidentally, FIG. 2 illustrates a state where the sample probe 11a gains access to the detergent storage part 14.

Next, washing of the sample probe 11a will be described. The sample probe 11 sucks the sample (serum, whole blood, urine and so forth) in accordance with analysis items. In general, before sucking the next sample, the electromagnetic valve 35 is opened so as to push out the washing water (inside washing water) 37 from the feed pump 36 into the sample probe 11a and to wash the inner side of the sample probe 11a. As for washing of the outer side of the sample probe 11a, washing is performed by discharging a washing liquid from the washing tank 13.

As stain of the sample is accumulated on the inner side of the sample probe 11a, inter-specimen contamination and so forth are feared due to insufficient washing which is caused by narrowing of a diameter in the sample probe 11a and lowering of a per-unit time discharge amount of the inside washing water. In such a case, the inner side of the sample probe 11 is washed using a detergent. As for washing with the detergent, mainly the detergent is sucked and the detergent is discharged together with the inside washing water, this detergent sucking and discharging operation is repetitively performed a plurality of times and thereby the stain on the sample is removed.

In an aspect that the inner side of the sample probe 11a is washed with the detergent, there are various cases, and (1)

a case where an operation of automatically sucking the detergent out from the detergent storage part 14 after termination of measurement of the sample and discharging it together with the inside washing water in the washing tank 13 is performed, (2) a case where, in order to prevent inter-sample carry-over, while an operation is being conducted, the detergent is sucked out from the detergent storage part 14 and is discharged together with the inside washing water in the washing tank 13 and thereby the next sample is prevented from being contaminated, (3) a case where as finish washing, the vessel in which the detergent is contained is placed on the rack 16, the rack 16 is conveyed by the sample conveyance mechanism 17, the deterrent is sucked in the sample probe 11a and is discharged together with the inside washing water in the washing tank 11 thereby to wash it and so forth are general. Incidentally, in the case of (3), although the detergent is sucked out from a position which is different from the detergent storage part 14, the vessel in which the detergent is contained can be regarded as the detergent storage part.

Next, a detergent amount will be described. Here, a detergent aspiration amount which is typically necessary to wash the sample probe 11a is generally set in such a manner that "a maximum sample aspiration amount<the detergent aspiration amount" (in the following, also called a formula A) is settled. The purpose is to surely wash the inner side of the sample probe 11a by sucking the detergent exceeding the contaminated range of the sample.

Figure 3:
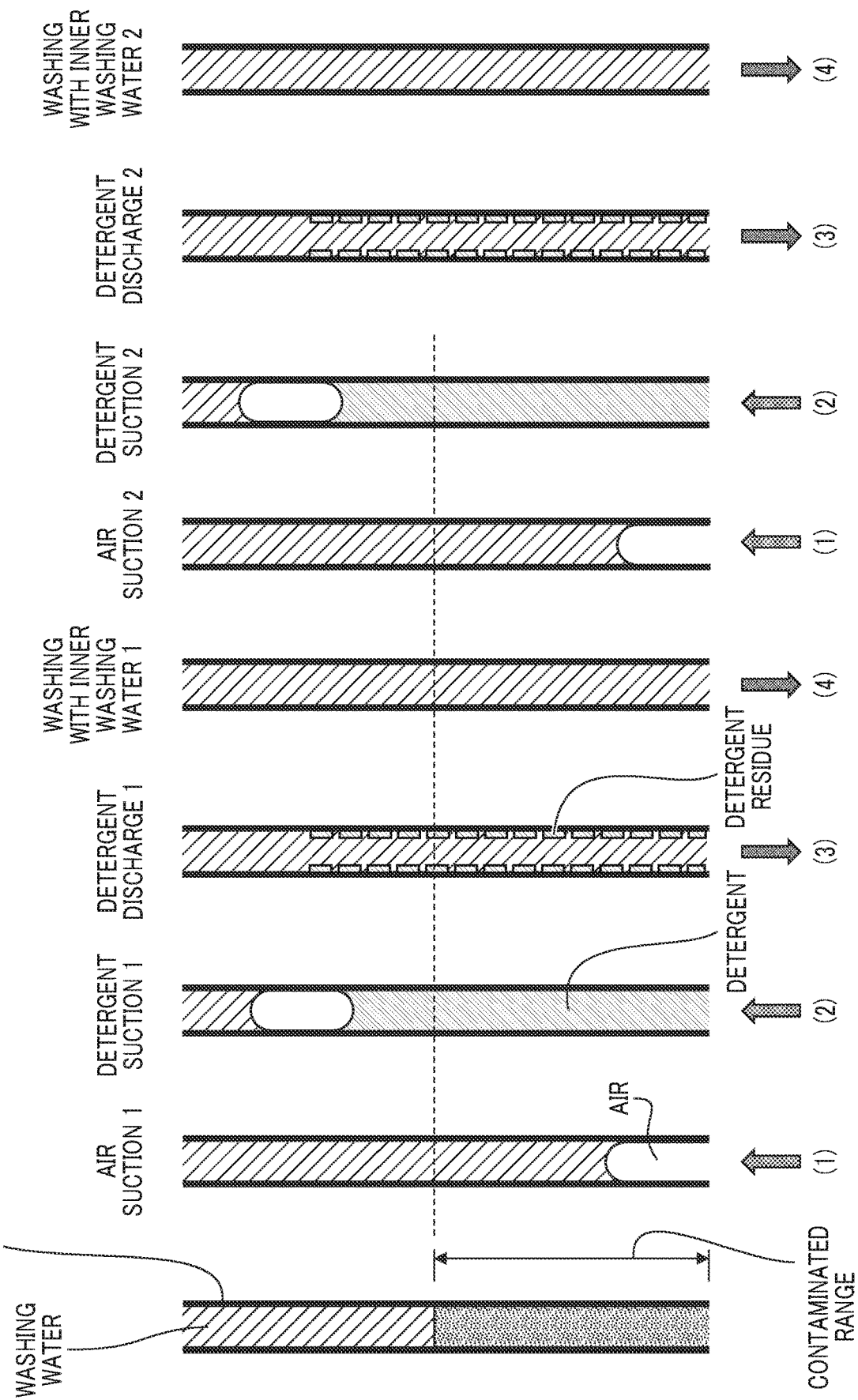
FIG. 3 is an explanatory diagram of a conventional sample probe washing operation.

Next, a conventional operation of washing the sample probe 11a will be described by using FIG. 3.

First, the sample probe 11 is washed with the inside washing eater which is fed from the feed tank 38 in the washing tank 13 and thereby the inside of the probe is filled with the washing water. Thereafter, it moves from the washing tank 13 to the position of the detergent storage part 14.

Next, the sample-use syringe 19 is operated to suck air (also called air) from a probe leading end before sucking the detergent (see (1)). Dilution of the detergent can be prevented by providing the air on the probe leading end when sucking the detergent. Since, due to presence of the washing water on the leading end of the sample probe 11a, when the sample probe 11a comes into contact with the detergent, the detergent is diffused into the washing water and is diluted with the washing water, the air functions as a buffer layer for preventing this dilution.

Next, the detergent is sucked after aspiration of the air (see (2)). The detergent which is under a condition that the this-time detergent aspiration amount meets the formula A is sucked and the inner side of the sample probe 11a is washed with the detergent exceeding the contaminated range.

Next, the detergent is discharged by the sample-use syringe 19 at the position of the washing tank 13 (see (3)). Since the detergent is left in the sample probe 11a simply by discharging it by the sample-use syringe 19, washing is performed with the inside washing water using the feed pump 36 so as to wash away the detergent which is adhered to the inner side of the sample probe 11a (see (4)). Incidentally, an inside washing water discharge timing may be performed at the same timing as the sample-use syringe 19 for time saving.

Washing of the inner side of the sample probe 11a is performed by repeating the operations (1) to (4) a plurality of times.

Next, an operation of washing the sample probe 11a of the present embodiment will be described by using FIG. 4. Incidentally, the controller 21 controls the sample dispensing mechanism, the syringe pump and so forth and thereby the washing operation concerned is performed. The same applies to later described washing operations.

The sample probe 11a is washed with the inside washing water which is fed from the feed tank 38 in the washing tank 13 and thereby the inside of the probe is filled with the washing water. Thereafter, it moves from the washing tank 13 to the position of the detergent storage part 14.

Next, the sample-use syringe 19 is operated so as to suck the air from the probe leading end before sucking the detergent (see. (1)).

Next, the detergent is sucked after sucking the air (see (2)). The this-time detergent aspiration amount may not meet the formula A. That it does not meet the formula A means that the detergent aspiration amount is smaller than that for the contaminated range of the sample probe 11a. However, that washing of the contaminated range is possible will be described later.

Next, discharge of the detergent is performed by moving to the washing tank 13 (see (3)). At this time, all the detergent is not discharged including the air, the air is retained in the sample probe 11a. Incidentally, thereafter, since washing with the inside washing water is not performed, the inner side of the sample probe 11a is in a state where the detergent is adhered to the inner side of the probe as illustrated in the drawing of "Detergent Discharge 1".

Incidentally, although, in many cases, a surfactant is contained in the detergent, the air is retained in the sample probe 11a in "Detergent Discharge 1", such a situation does not occur that the detergent blows up just like a balloon on the leading end of the sample probe 11a while the detergent is being discharged. Therefore, there is no risk that the detergent will scatter. In addition, while the detergent is being discharged, it is not necessary to discharge the washing water which washes the outer side of the sample probe 11a and therefore also a consumption amount of water can be suppressed. Incidentally, in a case where a discharging operation of the sample-use syringe 19 is slowly performed, it is also thought that drops of the detergent would be left on the leading end of the sample probe 11a in a hanging-down state after completion of discharge of the detergent. When the sample probe 11a is moved in this state, there is a possibility that the detergent may scatter. Accordingly, the risk of scattering of the detergent with movement of the probe may be eliminated by pouring a small amount of the washing water, the washing water which washes the outer side of the sample probe 11a, on the leading end of the sample probe 11a until movement is started.

On the other hand, detergent discharge may be performed to such an extent that no detergent is left on the leading end of the sample probe 11a and the air does not blow out from the leading end by increasing a discharge velocity of the syringe. In this case, since it does not occur that the drops of the detergent are brought into the state of hanging down on the leading end of the sample probe 11a, the washing water which washes the outer side of the sample probe 11a become unnecessary and therefore an effect of saving the washing liquid can be obtained.

In addition, since the air is sucked in advance before aspiration of the detergent, Air moves to the leading end direction of the sample probe 11a by pushing the detergent aside during a detergent discharging operation and therefore the amount of the detergent which is adhered to the inner side of the sample probe 11a can be stabilized.

In addition, after performing the detergent discharging operation as in "After Detergent Discharge 1", the detergent which is left on Air and is adhered to the inner side of the probe gradually diffuses toward the washing water side and spreads out. It is desirable to set a definite waiting time for diffusion of the detergent. However, since the surfactant is contained in the detergent, a diffusion velocity can be expected without setting the so definite waiting time. In addition, the air (segmented air) which is left after the detergent has been discharged by the sample-use syringe 19 keeps pulsing for a while in the sample probe 11a and then stands still. The washing water in the sample probe 11a pulsates in association with pulsation of this air and thereby it becomes possible to diffuse with ease the detergent which is left in the probe into the washing water. Incidentally, diffusion of the detergent which is induced by pulsation of the washing water may be more accelerated by vertically driving the sample-use syringe 19.

The second-time detergent aspiration operation is performed from this state. Then, the detergent which is adhered to a wall on the inner side and the detergent which diffuses above the air cooperate with movement of the air and thereby it becomes possible to push the detergent above the air as in "Middle of Detergent Aspiration 2". Incidentally, a colored triangular part which is illustrated in the drawing indicates a state where the washing water in which the deterrent is contained is pushed upward. As illustrated in the drawing, the washing water in which the detergent is contained can stay above the contaminated range. This corresponds to washing of a range which is wider than the contaminated range.

That is, it becomes possible to wash the contaminated range in the sample probe 11a with a small use amount of the detergent by performing aspiration-discharge of the detergent continuously while the air is being held with no discharge of the inside washing water. The more the number of times that the detergent aspiration-discharge is continuously performed while the air is being held is increased, the more the diffusion amount of the detergent in the washing water is increased and therefore the higher washing effect can be expected. Incidentally, that the inside washing water is not discharged means to perform the repetitive processes (1) to (3) in a state where the electromagnetic valve 35 in Fig. is closed. The electromagnetic valve 35 is opened only for the purpose of performing washing with the inside washing water in (4) which is the final process. That is, the controller controls the electromagnetic valve and performs control of feeding the washing water into the probe by closing the electromagnetic valve until the detergent is sucked the plurality of times and opening the electromagnetic valve in the process (4).

Incidentally, although the present operation describes washing of the inner side of the sample probe 11a, washing of the passage up to the sample-use syringe 19 can be also performed by repetitively repeating aspiration-discharge of the detergent without discharging the inside washing water. This is because it becomes possible to make the detergent arrive at the sample-use syringe 19 by increasing the number of repetition times. This operation is suitable for being performed not in an operation state while the sample is being measured but in a standby state in maintenance and so forth. At that time, since the detergent which is left in the sample probe 11a from the sample-use syringe 19 may be washed away by the feed pump 36 by taking time, it is very effective for performing washing which includes the passage with little detergent.

Figure 4:
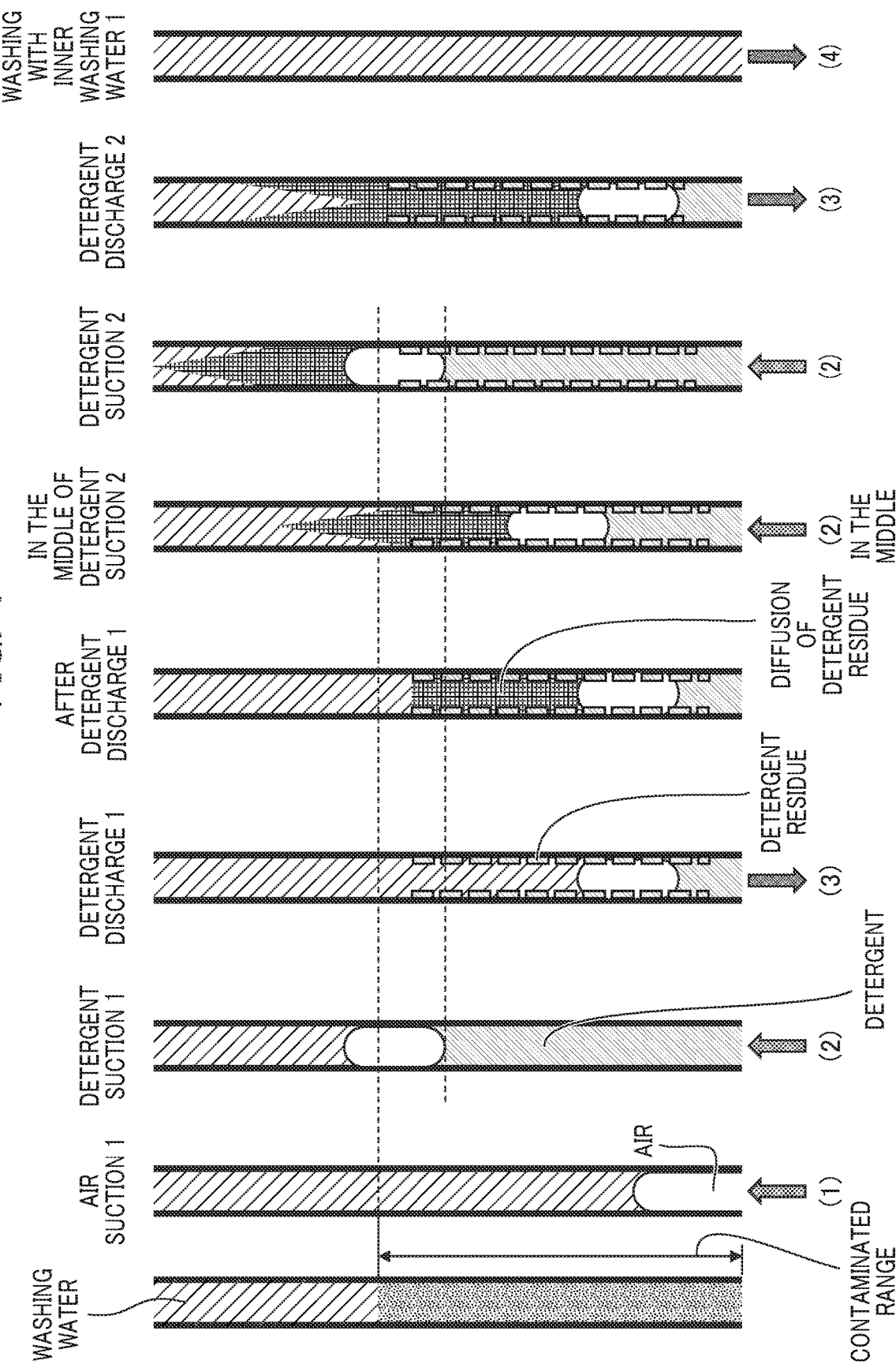
FIG. 4 is an explanatory diagram of a sample probe washing operation pertaining to the present embodiment.
Figure 5:
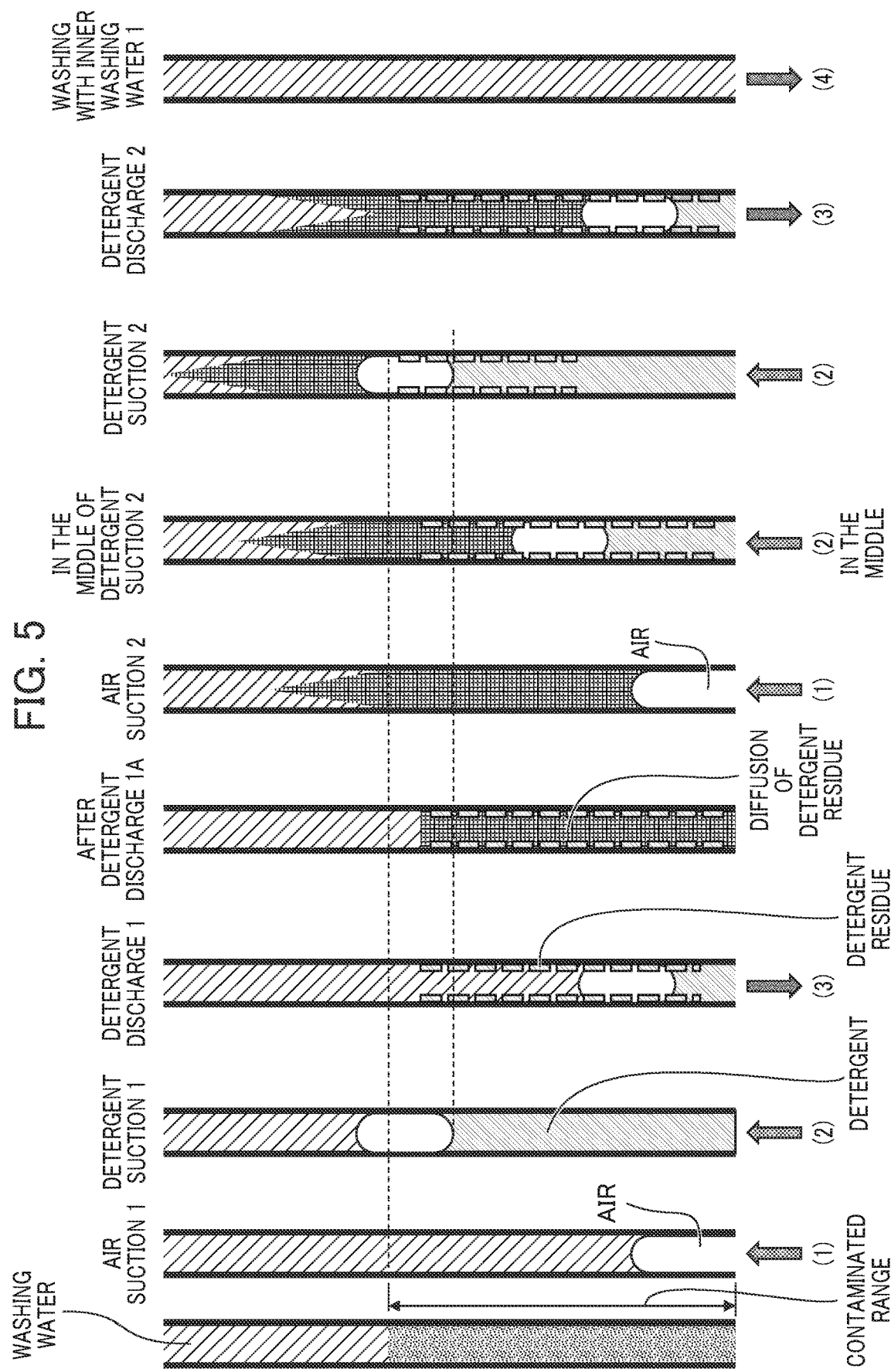
FIG. 5 is an explanatory diagram of a sample probe washing operation pertaining to the present embodiment.

Incidentally, although it has been described that there is no risk of detergent diffusion rather by not sending the air to the sample probe 11a after discharging the detergent, also an embodiment such as that in FIG. 5 is allowable by discharging it up to the air part while sending out the washing water for washing the outer side of the sample probe 11a when discharging the detergent in the washing tank 13. FIG. 5 is an explanatory diagram of another washing operation. A point which is different from that in FIG. 4 lies in presence/absence of discharge of the air. (see "After Detergent Discharge 1A"). Even when the air goes out from the leading end of the sample probe 11a, there is no risk of diffusion of the detergent owing to presence of the washing water for the outer side of the sample probe 11a and therefore no problem arises by paying attention to the state of detergent discharge. At that time, the effect becomes equivalent by sucking the air before performing the second-time detergent aspiration. Incidentally, control may be performed either to discharge or not to discharge part of the washing water in a state of "After Detergent Discharge 1A".

As above, as described in FIG. 5, the description was made about the point that when washing the probe by sucking the detergent in the probe the plurality of times, the syringe pump is controlled so as to discharge the detergent after sucking the detergent and to suck the next detergent without feeding the washing water to the probe by the feed pump. Thereby, since the washing effect which is brought about by the first-time detergent diffusion and so forth lasts in the second and succeeding detergent aspiration, it becomes possible to wash the sample probe including the inside contaminated range with the use amount of the detergent which is smaller than heretofore.

Figure 6:
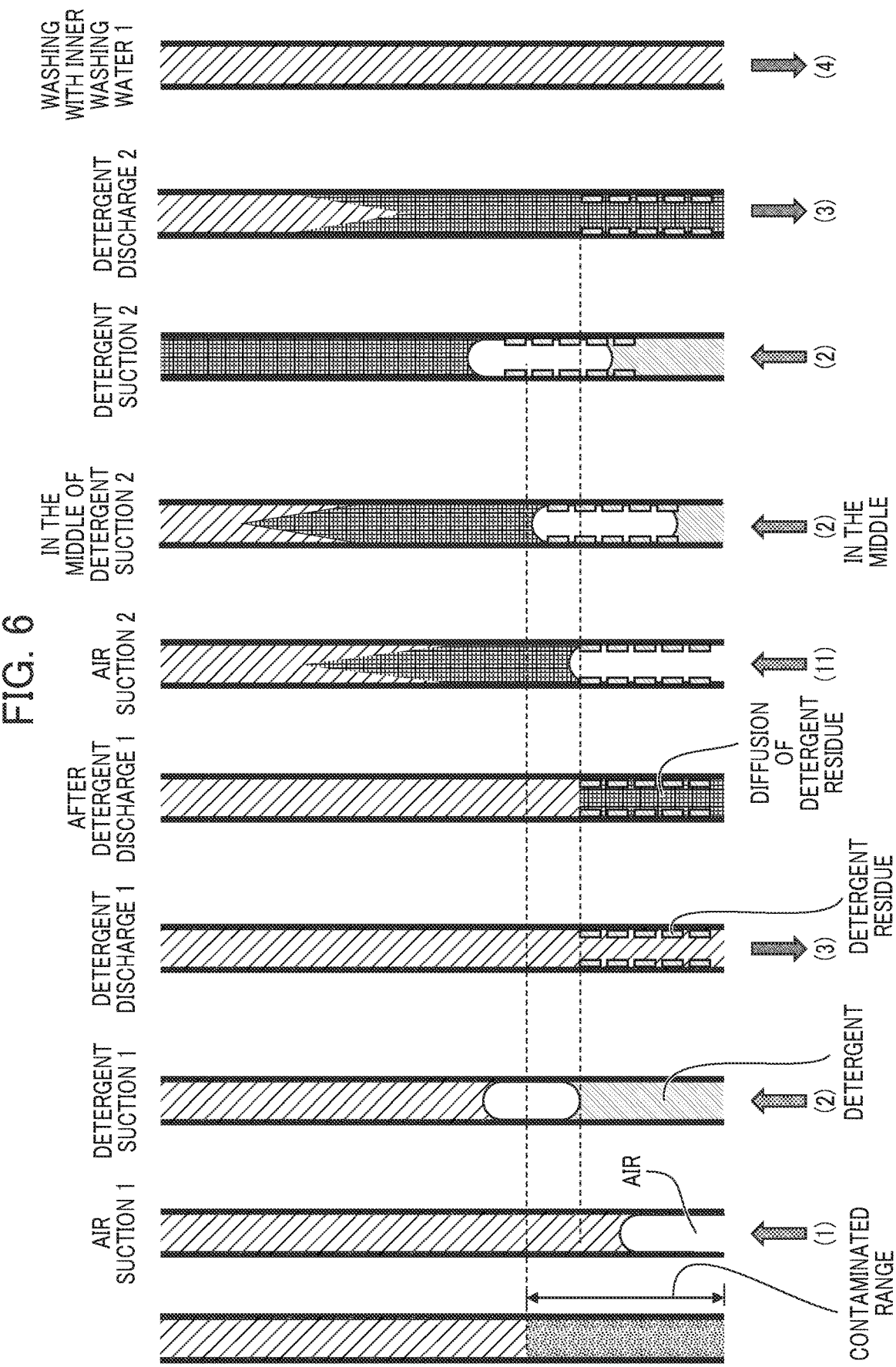
FIG. 6 is an explanatory diagram of a sample probe washing operation pertaining to the present embodiment.

In addition, an embodiment such as that in FIG. 6 is also allowable. FIG. 6 is an explanatory diagram of another washing operation. The point which is different from that in FIG. 5 is the point that the aspiration amount of the air is increased in second and succeeding times. In a case of performing washing of the inner side of the sample probe 11a with the detergent, it becomes possible to increase the range which can be washed with the detergent viewing from the leading end of the sample probe 11a even with the same use amount of the detergent by adopting a method of sucking the detergent after sucking the air by more increasing the amount of the air to be sucked in second and succeeding times than the first-time amount. This is because under the influence of the air, it becomes possible to move the residue itself of the detergent which is adhered to the inner side of the probe and the washing water in which the detergent is diffused more upward. In a case of washing the long passage ranging from the sample-use syringe 19 to the sample probe 11a by this detergent aspiration-discharge operation and so forth, washing becomes possible with the detergent which is reduced in aspiration frequency and consumption amount and therefore it becomes possible to perform a washing range using the detergent exceeding a maximum aspiration of the sample-use syringe 19.

Incidentally, it becomes possible to send the deterrent above the sample probe 11a also in such an aspect that firstly the detergent is sucked by using this operation and secondly the washing water which is discharged from the washing tank 13 is sucked. In such an aspect, it becomes possible to more reduce the use amount of the deterrent.

In addition, as a modified example, it is conceivable to perform aspiration from the probe leading end in order of the air→the detergent→the air→the washing liquid→the air→the detergent . . . . A wide range in the sample probe 11a can be washed while suppressing the consumption amount of the detergent in comparison with that when the detergent is sucked every time by using them in such combination.

Next, the washing operations in FIG. 3 to FIG. 6 will be described in FIGS. 7 and 8 by using flowcharts.

Figure 7:
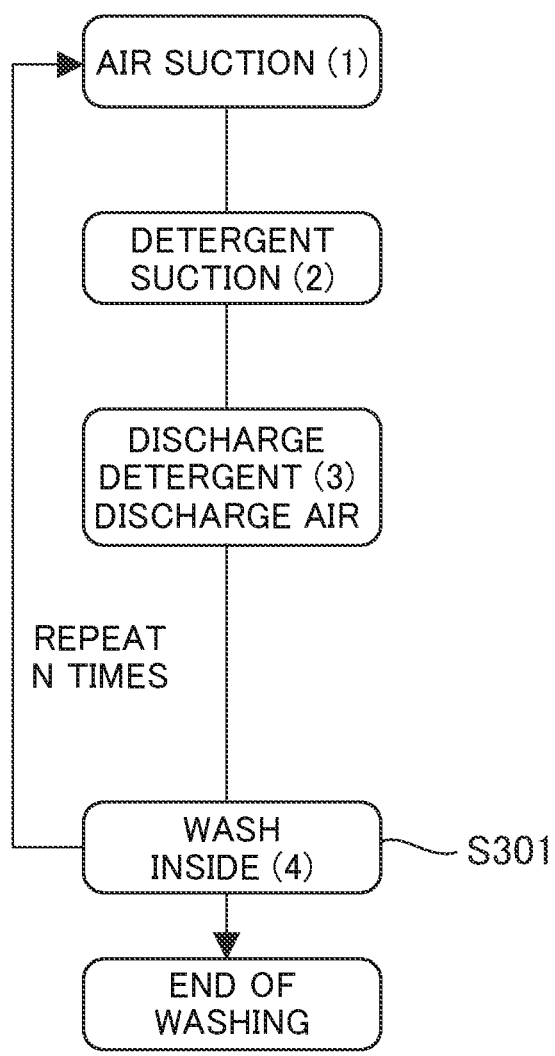
FIG. 7 is a flowchart of the sample probe washing operation in FIG. 3.
Figure 8:
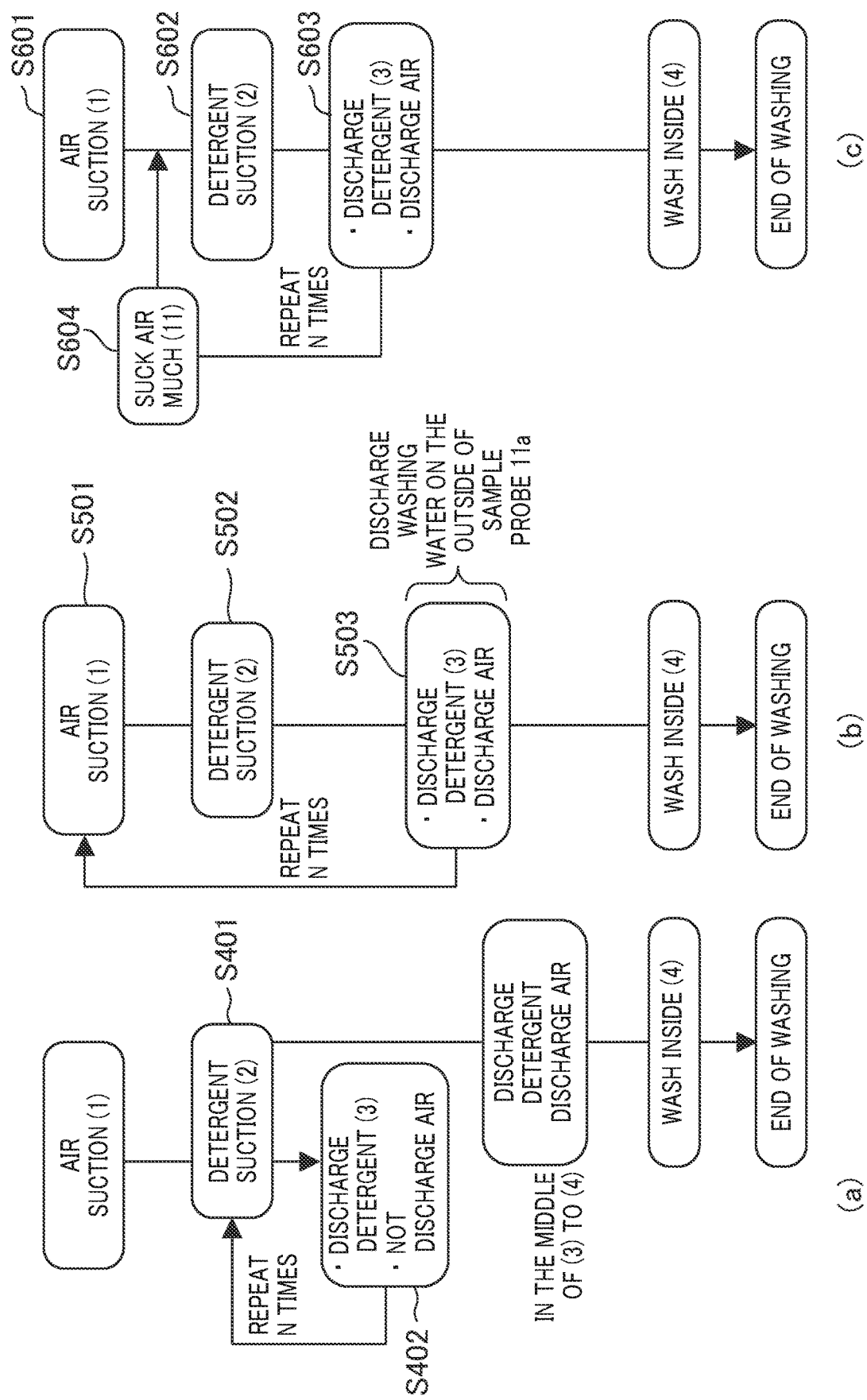
FIG. 8 is flowcharts of the sample probe washing operations in FIG. 4 to FIG. 6.

FIG. 7 is a flowchart of a conventional sample probe washing operation. As indicated in S301, it is an aspect that inside washing is performed with the washing water for every aspiration-discharge of the detergent.

On the other hand, FIGS. 8(a) to (c) are flowcharts which correspond to the respective washing operations in FIGS. 4 to 6.

In FIG. 8(a), although part of the detergent is discharged after sucking the detergent as in the aforementioned FIG. 4, the air is not discharged and aspiration of the detergent is repeated further N times. That is, it follows a flow that after repeating S401 and S402 N times, inside washing is performed with the washing water finally. Incidentally, it goes without saying that the detergent aspiration is performed N+1 times. This is, as described above, since the one-time amount of the detergent can be reduced in comparison with the conventional detergent aspiration which is performed N+1 times in FIG. 7, the use amount of the detergent can be reduced.

In FIG. 8(b), the detergent is discharged after sucking the detergent, and, also the air is discharged, and the air aspiration and detergent aspiration are repeated further N times as in the aforementioned FIG. 5. That is, it follows a flow that after repeating S501 to S503 N times, the inside washing is performed with the washing water finally. The detergent use amount can be reduced similarly to the above. However, in this case, it is desirable to discharge the washing water to the probe leading end from the outer side when discharging the air.

In FIG. 8(c), the air is sucked in S601, the detergent is discharged after sucking the detergent, and, also the air is discharged, and the air aspiration and the detergent aspiration are repeated further N times as in the aforementioned FIG. 6. That is, it follows a flow that after repeating S602 to S604 N times, the inside washing is performed with the washing water finally. At this time, in the air aspiration in S604, the air which is more than that of the air aspiration in S601 is sucked. Incidentally, the air aspiration amount may be increased with each repetition, may be made equal to the second-time air aspiration amount and may be returned to the air aspiration amount in S601. The effect is obtained by increasing the air aspiration amount in S601 at least once when repeating them N times. In addition, as described in FIG. 6, a modified example that while repeating them N times, the detergent is not sucked every time and the washing water is sucked instead is also allowable.

Next, the washing operation will be described by using FIG. 9 in regard to another modified example. The point which is different from that in FIG. 4 is the point that the air aspiration is not performed.

Although it has been described that dilution of the detergent is the matter to be concerned in regard to the case where the detergent is directly sucked without performing the air aspiration before the detergent aspiration in the aforementioned description, for example, in a case of a configuration that it is possible to automatically feed the detergent, even when the detergent is diluted with the washing water, it is possible to automatically feed the new detergent and therefore there is also a case where it becomes unnecessary to care about dilution of the detergent.

Accordingly, there are cases where the air aspiration is not essential in accordance with such a situation. The detergent is sucked without performing the air aspiration (see (2)). Next, the detergent is discharged. Incidentally, at that time, part of the washing water may be discharged (see (3)). Next, although the detergent is to be sucked again, also this time, the detergent is sucked without performing the air aspiration (see (4) Middle).

Since the detergent which is adhered to the side face of the sample probe 11a after the detergent discharge is filled with system water by the amount of a volume of the air by directly sucking the detergent without sucking the air, the amount of the detergent which diffuses in the sample probe 11a is increased. Accordingly, it becomes possible to move the detergent which diffuses in the sample probe 11a more quickly toward the back side of the sample probe 11a in the second and succeeding detergent aspiration operations.

Although in the present embodiment, the sample probe 11a has been described, it is the technology which is also applicable to a reagent probe which repetitively performs aspiration and discharge of the reagent and therefore is not limited to the sample probe. The liquid which is sucked in the probe may be either the sample or the reagent and may be another kind of liquid. That is, it is also applicable to dispensing mechanisms such as a sample dispensing mechanism, a reagent dispensing mechanism and so forth. In addition, it is also possible to obtain the same washing effect by setting the detergent on the rack 15 and repetitively sucking the detergent in the sample probe.

The embodiments have been described as above. In the above-mentioned embodiments, description was made about the matter that when washing the probe by sucking the detergent in the probe the plurality of times, the syringe pump is controlled so as to discharge the detergent after sucking the detergent and to suck the next detergent without feeding the washing water to the probe by the feed pump. Thereby, it becomes possible to wash the sample probe including the inside contaminated range with the use amount of the detergent which is smaller than heretofore.

In addition, as illustrated in FIG. 4 to FIG. 6, it is desirable that the probe suck the air in a state where the washing water is filled in the probe before sucking the deterrent and thereafter suck the detergent and the controller control the syringe pump so as to suck the next detergent in a state where the air is held in the probe. Thereby, dilution of the detergent can be prevented.

In addition, it is desirable that the probe suck the amount which is smaller than the maximum aspiration amount of the past sucked sample or reagent at least once in the plurality of times of the detergent aspiration. Incidentally, the past means the past on and after the washing with the detergent has been previously performed. Thereby, the use amount of the detergent can be more reduced than heretofore.

In addition, as described in FIG. 4, it is desirable that the controller control the syringe pump so as to discharge part of the detergent without discharging the sucked air and to suck the next detergent in a state where the remaining detergent is held in the probe. In addition, as described in FIG. 5, it is desirable that the controller control the syringe pump so as to discharge the sucked air without discharging the washing water which is filled in the probe and to suck the next detergent via the air in a state where the washing water is held in the probe. In addition, as described in FIG. 6, it is desirable that the controller control the syringe pump so as to suck the air which is more than the air which has been sucked firstly before sucking the next detergent.

In addition, as described in FIG. 9, the detergent may be sucked without sucking the air. That is, the probe may suck the detergent without sucking the air in a state where the washing water is filled in the probe before sucking the detergent, and the controller may control the syringe pump so as to discharge the sucked detergent and to suck the next detergent in a state where the washing water is held in the probe.

REFERENCE SIGNS LIST

1 . . . reaction disk
2 . . . reaction vessel
3 . . . washing mechanism
4 . . . spectrophotometer
4a . . . light source
5 . . . stirring mechanism
6 . . . stirring mechanism
7, 8 . . . reagent dispensing mechanism
7a, 8a . . . reagent probe
9 . . . reagent disk
10 . . . reagent bottle
11 . . . sample dispensing mechanism
11a . . . sample probe
13 . . . washing tank
14 . . . detergent storage part
15 . . . sample vessel
16 . . . rack
17 . . . sample conveyance mechanism
18 . . . reagent-use syringe pump
19 . . . sample-use syringe pump
20 . . . washing pump
21 . . . controller
30 . . . washing tank
31 . . . washing tank
32 . . . washing tank
33 . . . washing tank
35 . . . electromagnetic valve
36 . . . feed pump
37 . . . washing water
38 . . . feed tank
52 . . . sample probe drive means
53 . . . dispensing syringe drive means

The invention claimed is:

1. An automatic analyzer comprising:
a dispensing mechanism which is equipped with a probe which performs liquid aspiration and discharge;
a syringe pump which is connected to the probe and performs the liquid aspiration and discharge;
a feed pump which feeds washing water for washing the inside of the probe to the probe via the syringe pump;
a detergent storage part which stores a detergent which washes the probe;
a washing tank which is adapted to wash the probe; and
a controller which controls the dispensing mechanism and the syringe pump,
wherein the controller is configured to:
control the syringe pump to suction the detergent from the detergent storage part as a first detergent suction operation and to discharge less than all the detergent suctioned in the first detergent suction operation in the washing tank and to suction the detergent from the detergent storage part as a second detergent suction operation, which is after the first detergent suction operation, without feeding the washing water between the first detergent suction operation and the second detergent suction operation,
wherein the liquid is either a sample or a reagent, and
wherein respective amounts of detergent suctioned in the first detergent suction operation and in the second detergent suction operation are less than a maximum aspiration amount among one or more respective aspiration amounts of suctioned samples or regents suctioned by the probe before the first detergent suction operation.

2. The automatic analyzer according to claim 1,
wherein the controller is configured to:
control the syringe pump to suction a first amount of air into the probe in a state where the probe contains washing water before the first detergent suction operation,
wherein the suctioned air is in the probe during suction of the detergent in the second detergent suction operation.

3. The automatic analyzer according to claim 2,
further comprising an electromagnetic valve between the syringe pump and the feed pump,
wherein the controller controls the electromagnetic valve, and
wherein the controller is configured to close the electromagnetic valve until after the second detergent suction operation and thereafter open the electromagnetic valve to feed the washing water into the probe.

4. The automatic analyzer according to claim 2,
wherein the controller is configured to control the syringe pump to discharge the less than all the detergent suctioned in the first detergent suction operation without discharging the air and to suction the detergent in the second detergent suction operation in a state where the remaining detergent suctioned in the first detergent suction operation is held in the probe.

5. The automatic analyzer according to claim 2,
wherein the controller is configured to control the syringe pump to discharge the air without discharging the washing water which is in the probe and to suction the detergent in the second detergent suction operation in a state where the washing water is held in the probe.

6. The automatic analyzer according to claim 2,
wherein the controller is configured to control the syringe pump to suction a second amount of air, which is greater than the first amount of air, before suctioning the detergent in the second detergent suction operation.

7. The automatic analyzer according to claim 1,
wherein the probe suctions the detergent in the first detergent suction operation without sucking air before the first detergent suction operation in a state where the washing water is in the probe, and
wherein the controller controls the syringe pump so as to discharge the detergent suctioned in the first detergent suction operation and to suction the detergent in the second detergent suction operation in a state where the washing water is held in the probe.

8. The automatic analyzer according to claim 1,
further comprising:
a reaction disk which is equipped with a plurality of reaction vessels which include a mixture of the samples and the reagents; and
an analysis unit which analyses the mixtures.

9. A washing method for a probe of an automatic analyzer which comprises: a dispensing mechanism which is equipped with a probe which performs liquid aspiration and discharge,
a syringe pump which is connected to the probe and performs the liquid aspiration and discharge, a feed pump which feeds washing water for washing the inside of the probe to the probe via the syringe pump, a detergent storage part which stores a detergent which washes the probe, a washing tank which is adapted to wash the probe, and a controller which controls the dispensing mechanism and the syringe pump, the method comprising:

controlling, by the controller syringe pump to suction the detergent from the detergent storage part as a first detergent suction operation and to discharge less than all the detergent suctioned in the first detergent suction operation in the washing tank and to suction the detergent from the detergent storage part as a second detergent suction operation, which is after the first detergent suction operation, without feeding the washing water between the first detergent suction operation and the second detergent suction operation wherein the liquid is either a sample or a reagent, and wherein respective amounts of detergent suctioned in the first detergent suction operation and in the second detergent suction operation are less than a maximum aspiration amount among one or more respective aspiration amounts of suctioned samples or regents suctioned by the probe before the first detergent suction operation.

10. The automatic analyzer according to claim 1, further comprising:

a sample rack on which vessels which contain the samples are loaded thereon, wherein the detergent storage part is one of the vessels on the sample rack.

* * * * *